United States Patent
Zhang et al.

(10) Patent No.: US 7,848,219 B1
(45) Date of Patent: Dec. 7, 2010

(54) RADAR DETECTION FOR WIRELESS COMMUNICATION DEVICES

(75) Inventors: Ning Zhang, Saratoga, CA (US); Rich Mosko, Santa Clara, CA (US)

(73) Assignee: Atheros Communications, Inc., San Jose, CA (US)

( * ) Notice: Subject to any disclaimer, the term of this patent is extended or adjusted under 35 U.S.C. 154(b) by 300 days.

(21) Appl. No.: 12/187,239

(22) Filed: Aug. 6, 2008

Related U.S. Application Data (60) Provisional application No. 60/954,559, filed on Aug. 7, 2007.

(51) Int. Cl.
*H04J 11/00* (2006.01)
(52) U.S. Cl. .................................... 370/208; 370/210
(58) Field of Classification Search ........................ None
See application file for complete search history.

(56) References Cited

U.S. PATENT DOCUMENTS

| | | | | |
|---|---|---|---|---|
| 5,583,792 A | * | 12/1996 | Li et al. ........................ | 709/224 |
| 6,233,274 B1 | * | 5/2001 | Tsui et al. ..................... | 375/227 |
| 6,765,931 B1 | * | 7/2004 | Rabenko et al. ............. | 370/493 |
| 6,891,496 B2 | | 5/2005 | Husted et al. | |
| 6,954,171 B2 | | 10/2005 | Husted et al. | |
| 7,639,761 B2 | * | 12/2009 | Chu et al. ..................... | 375/346 |
| 2008/0015817 A1 | * | 1/2008 | Hashemian .................. | 702/183 |

\* cited by examiner

*Primary Examiner*—Steven H Nguyen
(74) *Attorney, Agent, or Firm*—Bever, Hoffman & Harms, LLP; Jeanette S. Harms (57) ABSTRACT

A method and apparatus for detecting radar signals in single and multiple (extension) channel wireless network frequencies uses spectral and DC analysis. Spectral images produced through a Fast Fourier transform may be captured and analyzed to determine if any radar signals may be present within the selected wireless network frequencies. A plurality of spectral images may also be analyzed to determine if frequency shifting radar signals are present as well. DC analysis of the power contained at the wireless carrier frequencies may detect radar signals that may be centered near those frequencies.

7 Claims, 5 Drawing Sheets

RADAR DETECTION FOR WIRELESS COMMUNICATION DEVICES

RELATED APPLICATIONS

This application claims priority of U.S. Provisional Patent Application 60/954,559, entitled "Radar Detection For Wireless Communication Devices" filed Aug. 7, 2007.

BACKGROUND OF THE INVENTION

1. Field of the Invention

Embodiments of the present invention generally relate to wireless local area networks and more specifically to detecting radar signals within wireless local area networks.

2. Description of the Related Art

Wireless Local Area Network (WLAN) devices must coexist with radar signals in the 5 GHz frequency bands. The general requirement is that WLAN devices should avoid operating on frequencies where radar signals have been detected.

A frequency band may be divided into one or more channels. The bands and channels for one form of wireless communication may be defined by, for example, the IEEE 802.11 family of standards. A WLAN transmitter typically transmits data through a channel to one or more WLAN receivers. A typical bandwidth of a channel is 20 MHz. Moreover, the IEEE 802.11 family of standards may also define how the data may be configured into data packets that typically include a preamble and a payload. The preamble may include training fields that typically precede the payload in each data packet. The IEEE 802.11 family of standards also defines modulation schemes such as Orthogonal Frequency-Division Multiplexing (OFDM) that use closely spaced orthogonal sub-carriers to carry the payload. Each orthogonal sub-carrier frequency is typically referred to as a "bin", data within each bin is typically encoded for OFDM modulation with a Fast Fourier transform (FFT), and the resulting real (I) and imaginary (Q) parts of the FFT are transmitted.

The IEEE 802.11n draft standard describes how a WLAN transmitter may transmit data through two channels instead of a single channel in order to increase the overall effective bandwidth of a channel, i.e. a wider channel may advantageously increase the data transfer rate. The two channels are typically chosen from within a selected band such that they do not overlap and are often referred to as a control channel and an extension channel. As in the single channel case, a preamble containing training fields precedes the payload transmission on both the control and the extension channels. The typical bandwidths of control and extension channels are the same as in the single channel case (20 MHz), which means the combined bandwidth is approximately 40 MHz.

If a radar signal is detected within a channel used for wireless communications, many specifications (e.g. IEEE 802.11 family of standards) require that WLAN devices leave that channel and move to a channel that does not interfere with the radar signals. In the case of a two-channel configuration, radar signals must be detected in both channels. Many radar signals in the 5 GHz spectrum typically include periodic bursts of radar pulses. The bursts typically have a period of about 1 ms and the pulse duration is typically between 1-5 us. There are many known methods to detect such radar signals. For example, one method measures the pulse duration and the pulse burst period and compares that information against many known radar characteristics. Another method simply looks for the presence of a received signal above a threshold during a ten second start-up period. Yet another method compares the amount of power that appears in-band to the power that appears out-of-band.

Some radar signals, however, have different characteristics. For example, other radar signals may have a wider pulse width between 50-100 us, and an additional characteristic in which the frequency of the radar signal varies in time causing the appearance of some radar signals to move across frequency bins over time. These radar signals may appear as a noise spur or other type of signal interference making radar signal detection difficult. Traditional radar detection methods, such as those described above, may not be effective in detecting some radar signals, particularly those that may change in frequency over time.

Radar signals may exist anywhere within a channel, in some instances aligning with the carrier frequency of a selected channel. Typically, when a WLAN signal is brought down to baseband, the energy of the carrier frequency is suppressed since it appears as a DC offset to the baseband signal and, as such, does not have any modulation information. Thus, if a radar signal is aligned to the carrier frequency, then the radar signal may be difficult to detect. In the case of a two channel WLAN, a radar signal may align with the carrier frequency of the combined control/extension channel. The carrier frequency energy is again suppressed as in the single channel case. Thus, the two channel WLAN also has a radar detection problem.

Therefore, what is needed in the art is a method for detecting radar signals, particularly radar signals that may have a frequency that varies in time and radar signals that may align with carrier frequencies. This method should be applicable to both single and multiple channel WLANs.

SUMMARY OF THE INVENTION

A method of detecting radar signals can include detecting an increase in power in a received signal and, when no increase in power is detected, analyzing the DC component sizes of the received signal. Advantageously, if a detected DC component associated with a particular gain setting is greater than a typical DC component associated with a similar gain setting, then radar signals may be present within the selected channel. The method can also include determining whether a maximum power of the received signal is greater than a radar threshold when an increase in power is detected. In one embodiment, the radar threshold can be programmable. FFT radar analysis can be performed when the maximum power of the received signal is greater than the radar threshold, the power of the received signal is in-band, and a preamble is not detected in the received signal. Thus, radar is advantageously detectable based on either analyzing the DC component sizes or performing FFT radar analysis.

In one embodiment, the method can further include splitting the received signal into multiple signals and for each signal determining whether the power is in-band, detecting a preamble in the signal, and performing FFT radar analysis when the maximum power of the signal is greater than the radar threshold, the power is in-band, and a preamble is not detected in the signal.

A wireless network device for implementing the above-described method can include an analog section, a digital section, and a processor. The digital section can include a DC removal unit for receiving an output of the analog section, an FFT unit for receiving an output of the DC removal unit, a spectral analysis unit for receiving the output of the FFT unit, a first power measuring unit for receiving the output of the DC removal unit, a filter for receiving the output of the DC removal unit, and a second power measuring unit for receiving the output of the filter. In this configuration, the processor can receive the output of the DC removal unit, the spectral analysis unit, the first power measuring unit, and the second power measuring unit. This configuration can be used for a single channel wireless network device. In one embodiment, the processor can include an averaging unit for receiving an output of the spectral analysis unit.

The digital section of another wireless network device can include a DC removal unit for receiving an output of the analog section, an FFT unit for receiving an output of the DC removal unit, a spectral analysis unit for receiving the output of the FFT unit, a first power measuring unit for receiving the output of the DC removal unit, a signal splitter for receiving the output of the DC removal unit, a plurality of processing paths for receiving an output of the signal splitter, and a processor. Each processing path can include a filter for receiving the output of the signal splitter and a power measuring unit for receiving the output of the filter. Advantageously, the frequencies filtered by these filters slightly overlap, thereby ensuring coverage of the complete bandwidth for the in-band signal analysis. In this configuration, a processor can receive the outputs of the DC removal unit, the spectral analysis unit, and each of the processing paths. This configuration can be used for a multiple channel wireless network device. In one embodiment, the processor can include an averaging unit for receiving an output of the spectral analysis unit.

DETAILED DESCRIPTION OF THE DRAWINGS

As described in further detail below, the presence of radar signals within wireless frequencies used by WLANs can be detected by analyzing spectral frequency data and by monitoring the power that is present in and near selected channels. The embodiments described herein may be applied to both single and multiple channel configurations.

Figure 1:
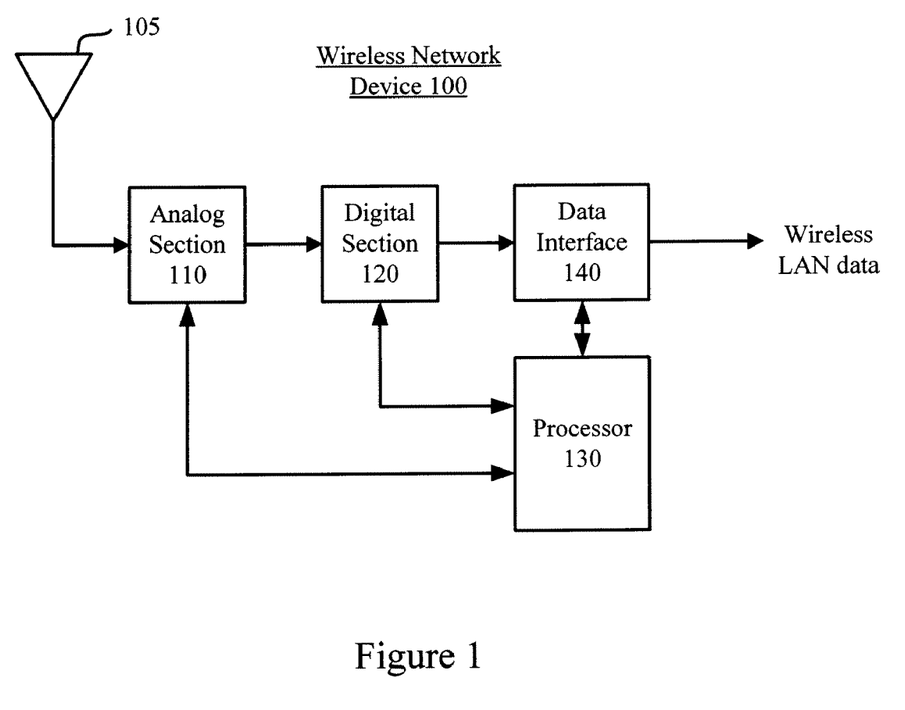
FIG. 1 illustrates a simplified diagram of a wireless network device.

FIG. 1 is a simplified diagram of a wireless network device 100 according to the specification. The wireless network device 100 includes, without limitation, an antenna 105, an analog section 110, a digital section 120, a processor 130, and a data interface 140. The antenna 105 is coupled to an input of the analog section 110. Radio frequency (RF) signals that include WLAN communication signals are received by the antenna 105 and are provided to the analog section 110. The analog section 110 processes the RF signals by converting the RF signals to digital baseband signals. The digital section 120 receives the digital baseband signals output by the analog section 110 and recovers WLAN data from the digital baseband signals. The recovered WLAN data, which is output by the digital section 120, is provided to the data interface 140 and is to other devices (not shown). The data interface 140 outputs the WLAN data in a form accessible to a user. The processor 130 is coupled to the analog section 110, the digital section 120, and the data interface 140. The processor 130 may be a central processing unit (CPU), a processing core, or some other device that may read and execute software instructions or micro-code. The processor 130 may control and configure the analog section 110, the digital section 120, and a portion of the data interface 140.

Figure 2:
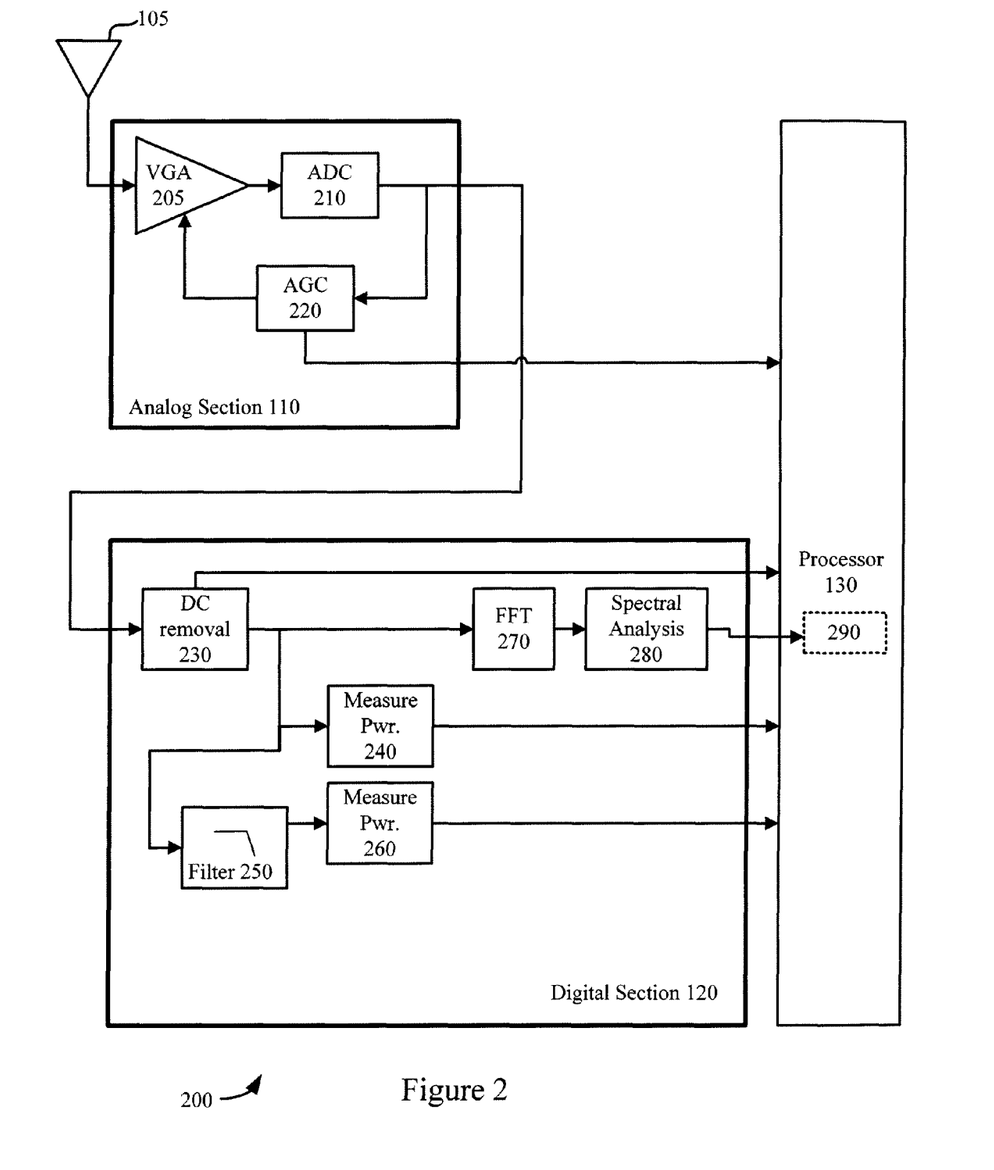
FIG. 2 illustrates a more detailed diagram of a portion of the wireless network device of FIG. 1.

FIG. 2 is a more detailed diagram of a portion of the wireless network device 200 of FIG. 1. Specifically, the antenna 105, the analog section 110, the digital section 120, and the processor 130 are shown in FIG. 2. Note that the data interface 140 of FIG. 1 has been omitted for clarity.

The analog section 110 includes, without limitation, a variable gain amplifier (VGA) 205, an analog-to-digital converter (ADC) 210, and an automatic gain controller (AGC) 220. The antenna 105 is coupled to the input of the VGA 205. RF signals received by the antenna 105 are provided to the VGA 205. In one embodiment, the VGA 205 is a wideband, variable gain amplifier that may increase the signal strength of the received RF signal. The VGA 205 may also include devices, such as one or more mixers, filters, and oscillators (not shown), to convert the received RF signal to an analog baseband signal. The analog baseband signal produced by the VGA 205 is provided to the input of the ADC 210, which in turn converts the analog baseband signal to a digital baseband signal. This digitized baseband signal of the ADC 210 is provided to the AGC 220 and to the digital section 120. The AGC 220 analyzes this digitized baseband signal and adjusts the gain of the VGA 205 so that the output of the ADC 210 is not limited by the upper or lower bounds of the ADC 210. The AGC 220 also may provide information about the gain setting of the VGA 205 through a coupling to the processor 130. The gain information may be used to detect radar signals and is described below in greater detail in conjunction with a DC removal unit 230.

In one embodiment, the AGC 220 may also detect preambles within data packets and signal the processor 130 that such preambles are present. As described herein, the preambles are transmitted as part of each data packet and, therefore, may indicate the presence of a valid data packet. The preamble information may be used to detect radar signals and is described below in greater detail in conjunction with FIG. 4.

The digital section 120 includes, without limitation, the DC removal unit 230, a first power measuring unit 240, a filter 250, a second power measuring unit 260, a FFT unit 270, and a spectral analysis unit 280. The output of the ADC 210 is coupled to the input of the DC removal unit 230. Baseband signals commonly include a DC component resulting from the carrier frequency. As previously noted, a DC component included in the baseband signal is removed prior to further processing. This is because the carrier frequency, which is the source of the DC component, contains no information, but instead adds only a DC component to the baseband signal. However, in the case when a radar signal has the same frequency as the carrier frequency, the presence of the radar signal may be hidden by the DC removal process.

In accordance with one embodiment of a radar detection method, the DC removal unit 230 determines the amount of DC present in the baseband signal and removes the DC component. Advantageously, the DC component size may indicate the presence of radar signals in the wireless communication channel, thus the size of the DC component is provided to the processor 130.

In one embodiment, the processor 130 may construct a table that includes typical DC component sizes and their associated gain settings applied by the AGC 220 to detect radar signals that may be centered on the carrier frequency. Such data may be collected while the wireless network device 200 is receiving transmitted data packets. After the table is built, if the processor detects a DC component associated with a particular gain setting that is greater than the DC component stored in the table associated with a similar gain setting, then radar signals may be present within the selected channel.

The DC corrected digital baseband signal from the DC removal unit 230 is provided to the first power measuring unit 240, the filter 250, and the FFT unit 270. The first power measuring unit 240 measures the power contained in the DC corrected digital baseband signal. In one embodiment, power is measured by adding the absolute values of the I and Q values in the DC corrected digital baseband signal. In an alternative embodiment, power may be measured by adding the square of the I and Q values together. The first power measuring unit 240 provides a power measurement of the signals both in and near the selected channel. This measure of power may indicate the presence of signals processed by the analog section 120 as well as radar signals (described in greater detail in conjunction with FIG. 4).

The filter 250 filters the data from the DC removal unit 230 to limit the data to a selected bandwidth and suppress out-of-band signals and noise. In one embodiment, the filter 250 limits the signal to 20 MHz, which is the bandwidth of a single channel as described herein, and may be implemented as a low pass filter. The output of the filter 250 is coupled to the input of the second power measuring unit 260. The second power measuring unit 260 may function substantially similar to the first power measuring unit 240. However, in this case, the second power measuring unit 260 measures the power of the filtered digital baseband signals output by the filter 250. The processor 130 may compare the power measured by the first and second power measuring units 240 and 260, respectively, to determine if radar signals are present within the selected channel. This is described in greater detail below in conjunction with FIG. 4.

Data from the output of the DC removal unit 230 is provided to the input of the FFT unit 270. The FFT unit 270 typically performs an FFT computation on the data from the DC removal unit 230 to recover the payload. The FFT unit 270 may also capture one or more spectral images to facilitate radar detection. The spectral analysis unit 280 analyzes the spectral images from the FFT unit 270. The analysis is described in greater detail in conjunction with FIGS. 3A and 3B. The data from the spectral analysis unit 280 is provided to the processor 130 and may be used to detect radar signals, which is described in greater detail in conjunction with FIG. 4.

Radar signals may be relatively narrower in bandwidth than a data packet. One method for detecting radar signals analyzes the FFT output of a selected channel and looks for output peaks that may correspond to narrow-band radar signals.

Figure 3A:
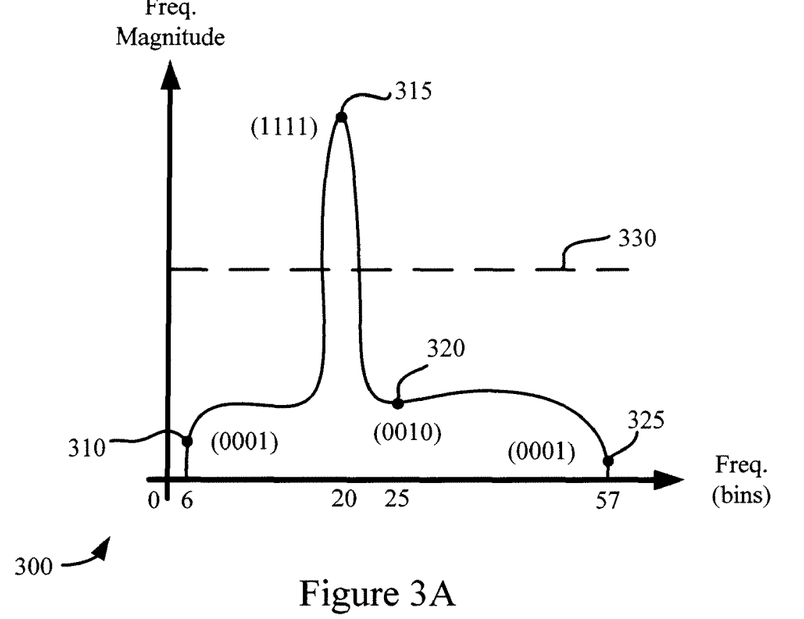
FIGS. 3A and 3B are graphs showing exemplary outputs of the FFT unit of FIG. 2.

FIG. 3A is a graph 300 showing an exemplary output of the FFT unit 270. As is well-known, OFDM modulation described by the IEEE 802.11 family of standards encodes data packets with sixty-four orthogonal carrier frequencies (bins). Twelve of the sixty-four bins are typically not used so that a guard band of six bins appears at the beginning and end of the OFDM packet. Thus, although there may be an FFT output point for each of the sixty-four bins, only bins 6 through 57 may have a non-zero FFT magnitude (i.e., bins 0-5 and 58-63 are zero). In this exemplary graph, only four FFT output points are shown and the other sixty have been left off for clarity. Point 310 shows the FFT magnitude associated with bin 6, point 315 is associated with bin 20, point 320 is associated with bin 25 and point 325 is associated with bin 57.

Analysis of the FFT output may include assigning descriptors to each FFT output point. In one embodiment, a four-bit descriptor is assigned to each FFT output point and the descriptor may be provided by the spectral analysis unit 280 of FIG. 2. The four-bit descriptor may be the concatenation of a one-bit threshold indicator and a three-bit magnitude indicator. The three-bit magnitude indicator may be used to describe the magnitude of a FFT output point relative to the output point with the largest magnitude in the current FFT output such as the output illustrated by graph 300. If the FFT output point exceeds a threshold, then the one-bit threshold indicator may be set. In one embodiment, the threshold indicator bit may be the most significant bit of the four-bit descriptor. The four-bit descriptors associated with FFT outputs may be analyzed to determine if radar signals are present in the selected channel and more particularly if a narrow band, frequency hopping radar signal is present.

In one embodiment, spectral analysis unit 280 may examine each output point in an FFT output and determine which FFT output point has the largest magnitude. The magnitude of the other output points in the FFT output 300 may then be described with a three-bit number corresponding to the output magnitude relative to the output point with the largest magnitude. Since three bits are used, (111) is the largest and (000) is the smallest magnitude. For example, an FFT output point with the largest magnitude may be assigned a three-bit magnitude descriptor of (111) whereas an output point that is approximately one-half the magnitude of the output point with the largest magnitude, may be assigned a three-bit magnitude descriptor of (100). Other bit widths may be used to implement the magnitude descriptor to provide more or less magnitude resolution.

The spectral analysis unit 280 may also compare each of the FFT output points to a threshold. If the magnitude of an FFT output point is greater than the threshold, then the threshold indicator bit may be set to one. In FIG. 3A, an exemplary threshold 330 is shown on the graph 300. Returning to our example, since point 315 is greater than the threshold, the fourth bit of the associated descriptor is set. In one embodiment, the threshold 330 may be used to determine whether any signals are within the selected channel. For example, if groups of FFT output points are greater than the threshold 330, then a narrow band signal, such as a radar signal may exist in the selected channel. On the other hand, if no FFT output points are greater than the threshold 330, then there may be no signals in the selected channel. If all of the FFT output points are greater than the threshold 330, then a wide band signal may be present in the selected channel. Table 1 below lists the FFT output points, associated bin number and related four-bit descriptors of graph 300.

TABLE 1

Descriptors for Output Points in FIG 3A

| Point | Bin | Descriptor |
|---|---|---|
| 310 | 6 | (0001) |
| 315 | 20 | (1111) |
| 320 | 25 | (0010) |
| 325 | 57 | (0001) |

Figure 3B:
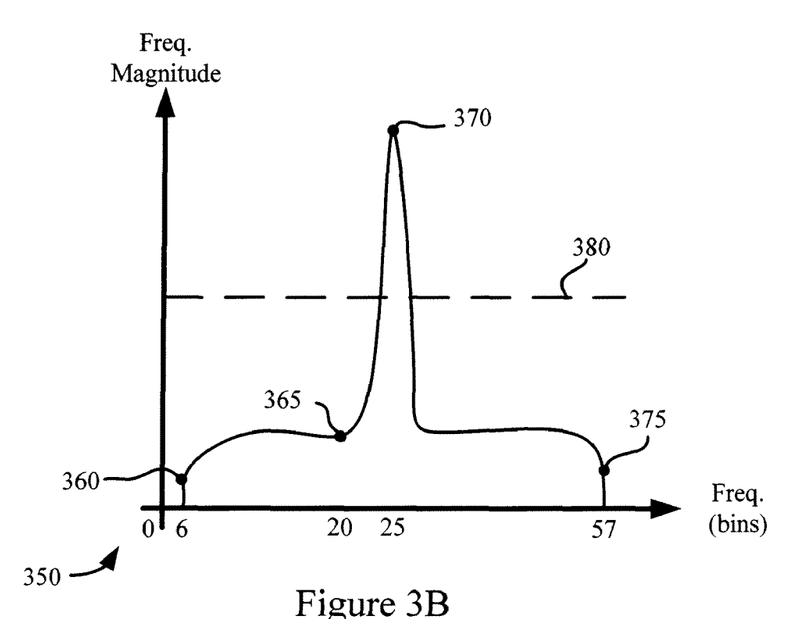

FIG. 3B is a graph 350 showing another exemplary output of the FFT unit 270. Another exemplary threshold 380 is shown in graph 350. In this example, the threshold 380 may be similar to the threshold 330 shown in graph 300. In some cases, the threshold may be relatively fixed in order to track FFT output peaks. Other times, the threshold may be changed to adapt to different environments. For example, if there is enough noise in the channel making FFT output peak detection relatively difficult, then the threshold may be increased, decreasing noise sensitivity. In graph 350, FFT output point 360 illustrates the FFT output magnitude corresponding to the FFT output at bin 6, point 365 corresponds to bin 20, point 370 corresponds to bin 25 and point 375 corresponds to bin 57. As described in FIG. 3A, descriptors may be assigned to the FFT output points by the spectral analysis unit 280. Table 2 below lists the points, associated bin number and related four-bit descriptors of graph 350.

TABLE 2

Descriptors for Output Points in FIG 3B

| Point | Bin | Descriptor |
|---|---|---|
| 360 | 6 | (0001) |
| 365 | 20 | (0010) |
| 370 | 25 | (1111) |
| 375 | 57 | (0001) |

Analysis of the FFT outputs may be used to determine if radar signals may be present in the selected channel. Certain narrow-band radar signals may be relatively easy to discern from the FFT outputs. Narrow-band radar signals may appear as peaks in the FFT output. An output peak may include one or more FFT output points. The descriptors for a particular FFT output may be examined to determine if narrow-band radar signals are present. For example, FFT output point 315 located at bin 20 in FIG. 3A may correspond to an output peak due to a radar signal. The peak may be located by analyzing the descriptors of the FFT output points. The descriptors may be scanned by either hardware (such as the spectral analysis unit 280), or by the processor 130 to locate FFT output peaks. In one embodiment, FFT output peaks may be located by reviewing the threshold indicator bit of the four-bit descriptor.

Analysis of two or more FFT outputs may be used to determine if frequency hopping radar signals may be present in the selected channel. For example, let FIG. 3A be a first FFT output and FIG. 3B be a second FFT output captured by the same wireless network device 200 a time period after the first FFT output. The presence of similar FFT output peaks located at different bins in different FFT outputs may indicate the presence of a frequency hopping radar signal in the selected channel. In one embodiment, the spectral analysis unit 280 may advantageously detect frequency hopping radar signals by scanning the descriptors associated with two or more FFT outputs. In this example, an FFT peak may be observed at bin 20 in FIG. 3A and at bin 25 in FIG. 3B, which may indicate the presence of a frequency hopping radar signal in the selected channel.

In one embodiment, the processor 130 can include an averaging unit 290 that captures the results for each FFT period. In this embodiment, further analysis can be performed over multiple, consecutive FFT periods. This averaging capability can advantageously improve the robustness of the analysis provided by processor 130.

Figure 4:
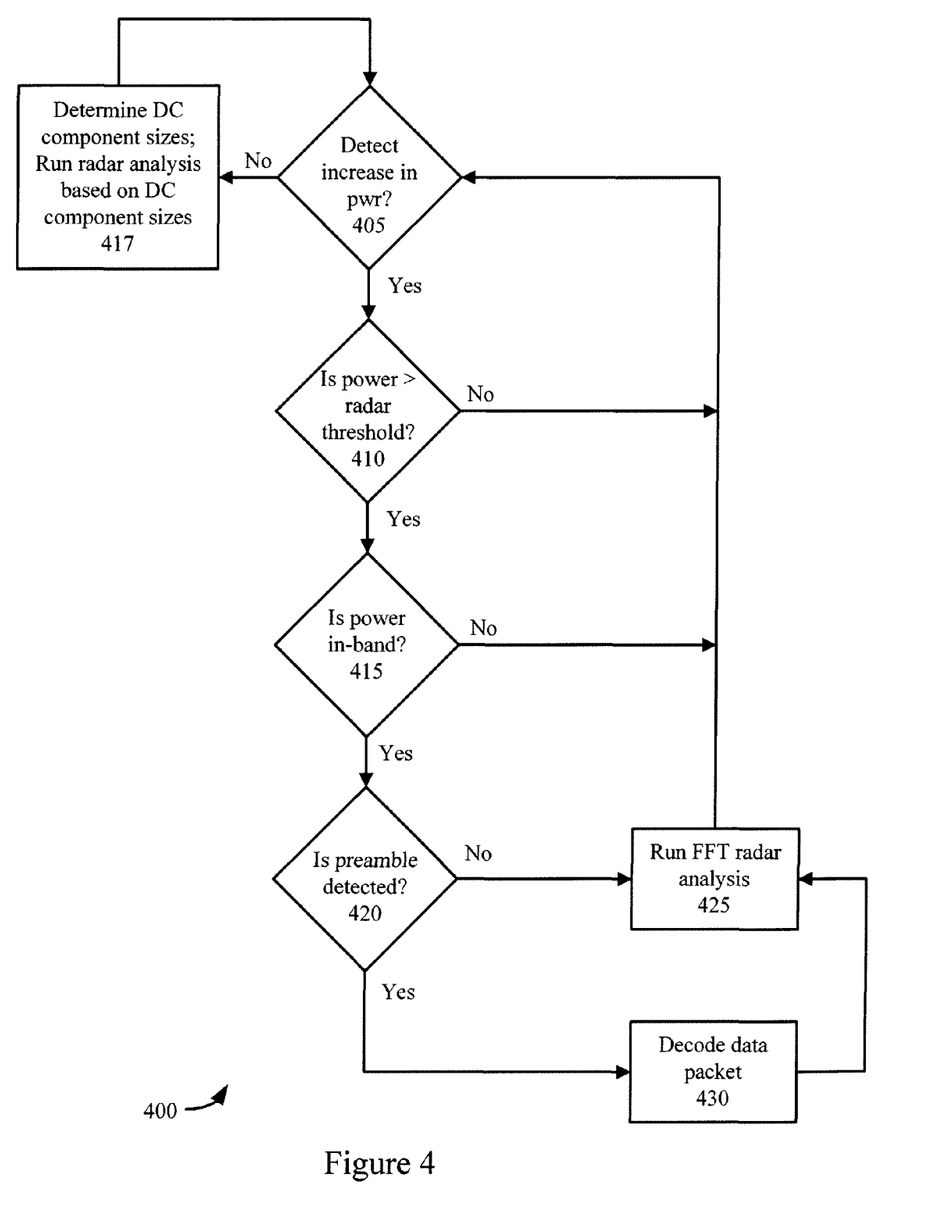
FIG. 4 illustrates a method for detecting radar signals, according to the specification.

FIG. 4 illustrates a method 400 for detecting radar signals, according to the specification. Persons skilled in the art will recognize that any system configured to perform the method steps in any order is within the scope of the invention.

Step 405 determines if there is an increase in power detected within the received signal. An increase in power may indicate the presence of a radar signal. In one embodiment, power in the received signal may be measured by the DC removal unit 230 and the power measurement unit 240 of FIG. 2. If no increase in power is detected, step 417 determines DC component sizes that are removed from the baseband signal and runs radar analysis based on such DC component sizes. As described in FIG. 2, a DC component that is larger than typical previously received DC components may be caused by radar signals. In one embodiment, DC component sizes may be determined by the DC removal unit 230 of FIG. 2 and analysis of such DC component sizes may be performed by the processor 130. The method 400 then returns to step 405 for the next signal.

If a power increase is detected in step 405, then step 410 determines if such power increase is greater than a radar power threshold. In one embodiment, the radar power threshold is a programmable threshold that may be used to select power measurements that may be associated with radar signals. If the increase in power is not greater than the radar power threshold, then the method returns to step 405. The power threshold may be set such that increases in measured power due to noise events advantageously do not result in radar signal detection.

If the increase in power is greater than the radar power threshold, then step 415 determines if the detected power is in-band (i.e., the detected power exists within the bandwidth of the selected channel). Because some wireless communication devices may receive signals beyond the wireless communication channel, step 415 refines the power measurement of step 405 by limiting the power measurement to in-band power. In one embodiment, filter 250 may be used in conjunction with power measuring unit 260 to determine if the detected power is in-band.

If the detected power is not in-band, then the method returns to step 405 for the next signal. If the detected power is in-band, then step 420 determines if a preamble has been detected. The presence of the preamble usually indicates the presence of a valid wireless communication packet (and therefore the received signal is not a radar signal). In one embodiment, the AGC 220 can inspect data from the ADC 210 and determine if the data from the ADC 210 includes a valid preamble. If a valid preamble is detected, then step 430 decodes the data packet. In one embodiment, the data packet may be decoded with the FFT unit 270. If a valid preamble is not detected, then step 425 performs FFT analysis to determine if radar signals are present in the wireless communication channel. The FFT analysis may include capturing the output of the FFT unit 270 and examining the descriptors associated with the output points as described in conjunction with FIGS. 3A and 3B.

The method 400 of FIG. 4 enables radar signals within a selected channel to be detected. Moreover, the FFT unit 270, which normally may be used to decode data packets, may be advantageously used to generate the spectral image used in step 425; thus, a dedicated FFT unit is not required since the FFT unit 270 would be otherwise idle.

The wireless network device of FIG. 2 may detect radar signals present in a single channel. When wireless data is sent through more than one channel, such as through control and extension channels, radar signals may be detected with a similar wireless network device. Such a network device is described below in FIG. 5.

Figure 5:
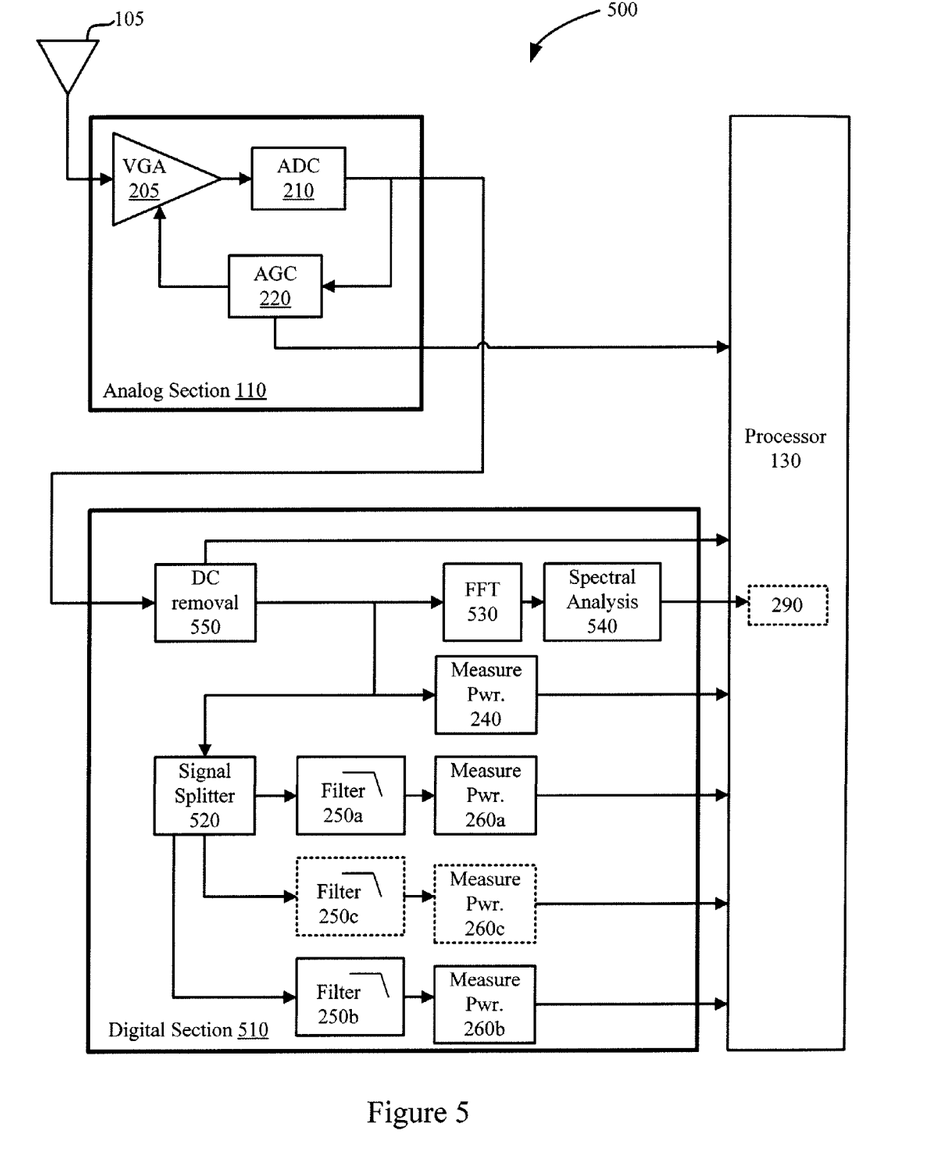
FIG. 5 illustrates a diagram of an alternative embodiment of a wireless network device.

FIG. 5 is a diagram of an alternative embodiment of a wireless network device 500. The wireless network device 500 may be configured to receive data packets simultaneously on a control and an extension channel as described by the IEEE 802.11n draft standard. The wireless network device 500 may also be configured to detect radar signals on both the control and extension channels. The wireless network device 500 includes, without limitation, an antenna 105, an analog section 110, a digital section 510, and a processor 130. The antenna 105, the analog section 110 and the processor 130 function substantially similar to the antenna 105, analog section 110 and processor described in conjunction with FIG. 2. A data interface, such as data interface 140 in FIG. 1, may also be included with the wireless network device 500, but is not shown here for clarity.

The digital section 510 includes a DC removal unit 550, an FFT unit 530, a spectral analysis unit 540, a signal splitter 520, a first, second and third power measurement units 240, 260*a*, and 260*b*, respectively, and a first and second filter 250*a* and 250*b*, respectively.

As with the wireless network device of FIG. 2, a digital baseband signal from the analog section 110 is provided to the DC removal unit 550 of the digital section 510. The DC removal unit 550 determines the size of the DC component present in the baseband signal and removes that DC component. As described herein, the size of the DC component may be used to determine the presence of radar signals, thus the size of the DC component is provided to the processor 130. The carrier frequency for a two channel (control and extension) system is typically located between the control and extension channels. Thus, in this case, the DC removal unit 550 removes the DC component of the baseband signal located between the control and extension channels. As described herein, the DC component size may be used to determine the presence of radar signals in the selected channel.

The processed digital baseband signal produced by the DC removal unit 550 is coupled to the first power measurement unit 240, the signal splitter 520, and the FFT unit 530. The first power measurement unit 240 functions similarly to the power measurement unit 240 of FIG. 2 and measures the power in the processed digital signal (in combination with DC removal unit 550). This power measurement may be used to determine if there are any signals present in and near the control and/or extension channels.

The processed digital baseband signal can be divided into two signals by the signal splitter 520. In one embodiment, a first signal may be the control channel signal, and a second signal may be the extension channel signal. The first divided signal is provided to the first filter 250*a* which removes out-of-band signal components similar to the filter 250 of FIG. 2. The output of the first filter 250*a* is provided to the second power measuring unit 260*a*. The second power measuring unit 260*a* measures the power included in the control channel signal similar to the power measuring unit 260 of FIG. 2. This power information is provided to the processor 130.

The second divided signal is provided to the input of the second filter 250*b*, which also removes out-of-band signal components (similar to the filter 250 of FIG. 2). The output of the second filter 250*b* is provided to the third power measuring unit 260*b*. The third power-measuring unit 260*b* measures the power in the extension channel (similar to the power measuring unit 260 of FIG. 2). This power information is provided to the processor 130.

The processed digital baseband signal is also provided to the input of the FFT unit 530. The FFT unit 530 may be used to create spectral images of the combined control and extension channel. The spectral images are coupled to the spectral analysis unit 540. This spectral image may differ from the spectral image described in conjunction with FIGS. 2 and 3 because the bandwidth of the combined control and extension channel is 40 MHz compared to 20 MHz bandwidth of a single channel. However, the same analysis techniques may be applied as before. For example, the four-bit descriptors may be assigned to FFT output points in the same manner as described in FIGS. 3A and 3B.

The method 400 of FIG. 4 may be applied to the wireless network device 500 with only a small modification. For example, because two channels are being used, step 415 may be modified to check the in-band power for both the control and extension channels. Thus, if power is detected in the control or the extension channels, the method 400 proceeds to step 420 to determine if preambles have been detected. On the other hand, if power is not detected in either the control or the extension channels, then the method 400 returns to step 405. The other steps of the method 400 described in FIG. 4 may remain the same.

The FFT unit 530 may be configured to process data for a 40 MHz channel, which is the typical bandwidth required for a combined control and extension channel. In one embodiment, an additional processing path (receiving another output of signal splitter 520) may include a filter 250*c* and a power measuring unit 260*c*. The filter 250*c* can provide a slight overlap in frequencies between filters 250*a*/250*c* as well as between filters 250*b*/250*c*. This overlap can advantageously ensure coverage of the complete bandwidth for the in-band signal analysis performed by processor 130. Additionally, when analyzing the results from power measuring units 260*a*, 260*b*, and 260*c*, processor 130 can determine whether frequency hopping occurs between the processing paths (each processing path including a filter a power measuring unit). Note that other embodiments may include any number of processing paths depending on the multiple frequency band being evaluated, the capability of the signal splitter, and the availability of filters.

Although illustrative embodiments of the invention have been described in detail herein with reference to the accompanying figures, it is to be understood that the invention is not limited to those precise embodiment. They are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. A wireless network device comprising:
    an analog section;
    a digital section including:
        a DC removal unit for receiving an output of the analog section;
        an FFT unit for receiving an output of the DC removal unit;
        a spectral analysis unit for receiving the output of the FFT unit;
        a first power measuring unit for receiving the output of the DC removal unit;
        a filter for receiving the output of the DC removal unit; and
        a second power measuring unit for receiving the output of the filter; and
    a processor for receiving the output of the DC removal unit, the spectral analysis unit, the first power measuring unit, and the second power measuring unit.

2. The wireless network device of claim 1, wherein the processor includes an averaging unit for receiving an output of the spectral analysis unit.

3. A wireless network device comprising:
    an analog section;
    a digital section including:
        a DC removal unit for receiving an output of the analog section;

an FFT unit for receiving an output of the DC removal unit;

a spectral analysis unit for receiving the output of the FFT unit;

a first power measuring unit for receiving the output of the DC removal unit;

a signal splitter for receiving the output of the DC removal unit;

a first filter for receiving the output of the signal splitter; and a second power measuring unit for receiving the output of the first filter; and a second filter for receiving the output of the signal splitter; and a third power measuring unit for receiving the output of the second filter; and a processor for receiving the output of the DC removal unit, the spectral analysis unit, the first power measuring unit, the second power measuring unit, and the third power measuring unit.

4. The wireless network device of claim 3, wherein the processor includes an averaging unit for receiving an output of the spectral analysis unit.

5. A wireless network device comprising:

an analog section;

a digital section including:

a DC removal unit for receiving an output of the analog section;

an FFT unit for receiving an output of the DC removal unit;

a spectral analysis unit for receiving the output of the FFT unit;

a first power measuring unit for receiving the output of the DC removal unit;

a signal splitter for receiving the output of the DC removal unit;

a plurality of processing paths, each processing path for receiving an output of the signal splitter, and each processing path including:

a filter for receiving the output of the signal splitter; and a power measuring unit for receiving the output of the filter; and a processor for receiving the output of the DC removal unit, the spectral analysis unit, the first power measuring unit, and each processing path.

6. The wireless network device of claim 5, wherein frequencies filtered by filters of the plurality of processing paths overlap.

7. The wireless network device of claim 5, wherein the processor includes an averaging unit for receiving an output of the spectral analysis unit.

* * * * *